(12) United States Patent
Tangirala et al.

(10) Patent No.: US 11,536,456 B2
(45) Date of Patent: Dec. 27, 2022

(54) FUEL AND AIR INJECTION HANDLING SYSTEM FOR A COMBUSTOR OF A ROTATING DETONATION ENGINE

(71) Applicant: General Electric Company, Schenectady, NY (US)

(72) Inventors: Venkat Eswarlu Tangirala, Niskayuna, NY (US); Narendra Digamber Joshi, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 240 days.

(21) Appl. No.: 16/164,474

(22) Filed: Oct. 18, 2018

(65) Prior Publication Data

US 2019/0120492 A1   Apr. 25, 2019

Related U.S. Application Data

(60) Provisional application No. 62/576,366, filed on Oct. 24, 2017.

(51) Int. Cl.
*F23R 7/00* (2006.01)
*F23R 3/02* (2006.01)
(Continued)

(52) U.S. Cl.
CPC ............ *F23R 3/02* (2013.01); *F02C 3/14* (2013.01); *F02C 5/02* (2013.01); *F23R 7/00* (2013.01);
(Continued)

(58) Field of Classification Search
CPC ...... F02C 5/02; F02C 3/14; F23R 7/00; F23R 3/02
See application file for complete search history.

(56) References Cited

U.S. PATENT DOCUMENTS 1,033,015 A * 7/1912 Holzwarth ............... F23R 3/28
60/741
2,471,892 A * 5/1949 Price ...................... F02C 3/085
60/39.83
(Continued)

FOREIGN PATENT DOCUMENTS

CN     204042975 U    12/2014
CN     104792534 A     7/2015
(Continued)

OTHER PUBLICATIONS

Wang et al., "Induction for multiple rotating detonation waves in the hydrogen-oxygen mixture with tangential flow", International Journal of Hydrogen Energy, vol. 39, Issue: 22, pp. 11792-11797, Jul. 24, 2014.

*Primary Examiner* — Ted Kim
(74) *Attorney, Agent, or Firm* — Venable LLP; Elizabeth C. G. Gitlin; Michele V. Frank

(57) ABSTRACT

A fuel and air injection handling system for a rotating detonation engine is provided. The system includes a compressor configured to compress air received via a compressor inlet and configured to output the air that is compressed as swirling, compressed air through a compressor outlet. The system also includes an annular rotating detonation combustor fluidly coupled with the compressor outlet. The annular rotating detonation combustor has a detonation cavity that extends around an annular axis, the annular rotating detonation combustor configured to combust the compressed air from the compressor in detonations that rotate within the detonation cavity around the annular axis of the annular rotating detonation combustor. The annular rotating detonation combustor is fluidly and directly coupled with the compressor outlet.

11 Claims, 3 Drawing Sheets

(51) Int. Cl.
*F02C 3/14* (2006.01)
*F02C 5/02* (2006.01)

(52) U.S. Cl.
CPC ...... *F05D 2210/30* (2013.01); *F05D 2220/32* (2013.01)

(56) References Cited

U.S. PATENT DOCUMENTS

| | | | | |
|---|---|---|---|---|
| 2,639,583 A * | 5/1953 | Steele | ............... | F02C 3/073 60/792 |
| 2,648,492 A * | 8/1953 | Stalker | ............... | F02C 3/00 415/181 |
| 2,694,291 A * | 11/1954 | Rosengart | ............... | F23R 3/50 60/804 |
| 2,718,757 A * | 9/1955 | Bloomer | ............... | F23R 3/12 60/737 |
| 2,736,168 A * | 2/1956 | Hanley | ............... | F23R 3/44 60/756 |
| 2,807,932 A * | 10/1957 | Bodine, Jr. | ............... | F04D 29/522 60/725 |
| 3,067,582 A * | 12/1962 | Schirmer | ............... | F23R 3/14 60/748 |
| 3,240,010 A * | 3/1966 | Morrison | ............... | F23R 7/00 60/213 |
| 3,269,119 A * | 8/1966 | Price | ............... | F01D 5/027 60/804 |
| 3,818,695 A * | 6/1974 | Rylewski | ............... | F02C 3/14 60/39.183 |
| 3,892,069 A * | 7/1975 | Hansford | ............... | F02K 3/068 60/804 |
| 5,619,855 A * | 4/1997 | Burrus | ............... | F23R 3/02 60/736 |
| 6,279,322 B1 | 8/2001 | Moussa | | |
| 6,918,740 B2 * | 7/2005 | Liu | ............... | F04D 29/665 415/119 |
| 6,928,822 B2 | 8/2005 | Rock | | |
| 7,784,267 B2 | 8/2010 | Tobita et al. | | |
| 9,046,058 B2 | 6/2015 | Claflin | | |
| 9,243,805 B2 | 1/2016 | Bergen | | |
| 9,512,805 B2 | 12/2016 | Snyder | | |
| 9,556,794 B2 * | 1/2017 | Falempin | ............... | F23R 7/00 |
| 9,599,065 B2 | 3/2017 | Falempin | | |
| 9,816,463 B2 * | 11/2017 | Falempin | ............... | F23R 7/00 |
| 2005/0138914 A1* | 6/2005 | Paul | ............... | F02C 3/08 60/246 |
| 2012/0204534 A1* | 8/2012 | Kenyon | ............... | F02C 5/12 60/204 |
| 2012/0272663 A1 | 11/2012 | Moussa et al. | | |
| 2013/0086908 A1* | 4/2013 | Negulescu | ............... | F23R 3/50 60/726 |
| 2014/0196460 A1 | 7/2014 | Falempin et al. | | |
| 2015/0167544 A1 | 6/2015 | Joshi et al. | | |
| 2015/0300630 A1 | 10/2015 | Juan | | |
| 2015/0308348 A1* | 10/2015 | Minick | ............... | F23R 7/00 60/776 |
| 2015/0323185 A1* | 11/2015 | Silkowski | ............... | F02C 3/14 60/748 |
| 2017/0074520 A1* | 3/2017 | O'Donnell | ............... | F02C 3/14 |

FOREIGN PATENT DOCUMENTS

| | | | |
|---|---|---|---|
| CN | 104948348 A | 9/2015 | |
| CN | 104154567 B | 12/2015 | |
| CN | 104110325 A | 1/2016 | |
| CN | 105351113 A | 2/2016 | |
| JP | 2005133600 A | 5/2005 | |
| RU | 2468292 C2 | 11/2012 | |
| RU | 2573427 C2 | 1/2016 | |
| WO | WO-2016018172 A1 * | 2/2016 | ............... F23R 7/00 |

* cited by examiner

FUEL AND AIR INJECTION HANDLING SYSTEM FOR A COMBUSTOR OF A ROTATING DETONATION ENGINE

CROSS-REFERENCE TO RELATED APPLICATIONS

This application claims priority to U.S. Provisional Application No. 62/576,366, which was filed on 24 Oct. 2017, and the entire disclosure of which is incorporated herein by reference.

FIELD

The present subject matter relates generally to fuel and air injection systems of engines, such as for rotating detonation engines.

BACKGROUND

A rotating detonation engine includes an annulus with an inlet end through which a fresh fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus and is exhausted with the exhaust flow.

The detonation wave provides a high-pressure region in an expansion region of the combustion. Rotating detonation pressure gain combustion systems are expected to have significant advantages over pulse detonation pressure gain combustors as the net non-uniformity of flow entering a turbine in these systems is expected to be lower by a factor of two to ten.

Traditional gas turbine engines include components to reduce or eliminate swirling movements in air passing from compressors in the engines to combustors in the engines. For example, some gas turbine engines include diffusors and deswirler vanes that remove or reduce the swirling motion of compressed air that is output by compressors before the compressed air reaches the combustors in the engines. Inclusion of the diffusors and deswirler vanes can increase the size of the engines and the footprints of the engines.

SUMMARY

In one embodiment, a fuel and air injection handling system for a rotating detonation engine is provided. The system includes a compressor configured to compress air received via a compressor inlet and configured to output the air that is compressed as swirling, compressed air through a compressor outlet. The system also includes an annular rotating detonation combustor fluidly coupled with the compressor outlet. The annular rotating detonation combustor has a detonation cavity that extends around an annular axis, the annular rotating detonation combustor configured to combust the compressed air from the compressor in detonations that rotate within the detonation cavity around the annular axis of the annular rotating detonation combustor. The annular rotating detonation combustor is fluidly and directly coupled with the compressor outlet (e.g., without a diffusor conduit and without a deswirler vane between the compressor outlet and the rotating detonation combustor).

In one embodiment, a fuel and air injection handling system for a rotating detonation engine is provided. The system includes a compressor configured to compress input air and to output the input air that is compressed as compressed air through a compressor outlet, and a combustor fluidly coupled with the compressor outlet. The combustor has an annular detonation cavity that extends around an annular axis. The combustor is configured to combust the compressed air from the compressor in detonations that rotate around the annular axis within the annular detonation cavity. The combustor is fluidly and directly coupled with the compressor outlet (e.g., without one or more of a diffusor conduit or a deswirler vane between the compressor outlet and the annular detonation cavity).

In one embodiment, a method for handling fuel and air injection for a rotating detonation engine is provided. The method includes compressing inlet air that is input into a compressor to swirling, compressed air, directing the swirling, compressed air into an annular rotating detonation combustor without the swirling, compressed air passing through a diffusor conduit or a deswirler vane between the compressor and the combustor, and combusting the swirling, compressed air into one or more rotating detonations that rotate around an annular axis of the combustor in a detonation cavity of the combustor.

These and other features, aspects and advantages of the present inventive subject matter will become better understood with reference to the following description and appended claims. The accompanying drawings, which are incorporated in and constitute a part of this specification, illustrate embodiments of the inventive subject matter and, together with the description, explain the principles of the inventive subject matter.

BRIEF DESCRIPTION OF THE DRAWINGS

A full and enabling disclosure of the inventive subject matter, including the best mode thereof, directed to one of ordinary skill in the art, is set forth in the specification, which refers to the appended figures, in which.

DETAILED DESCRIPTION

Figure 1:
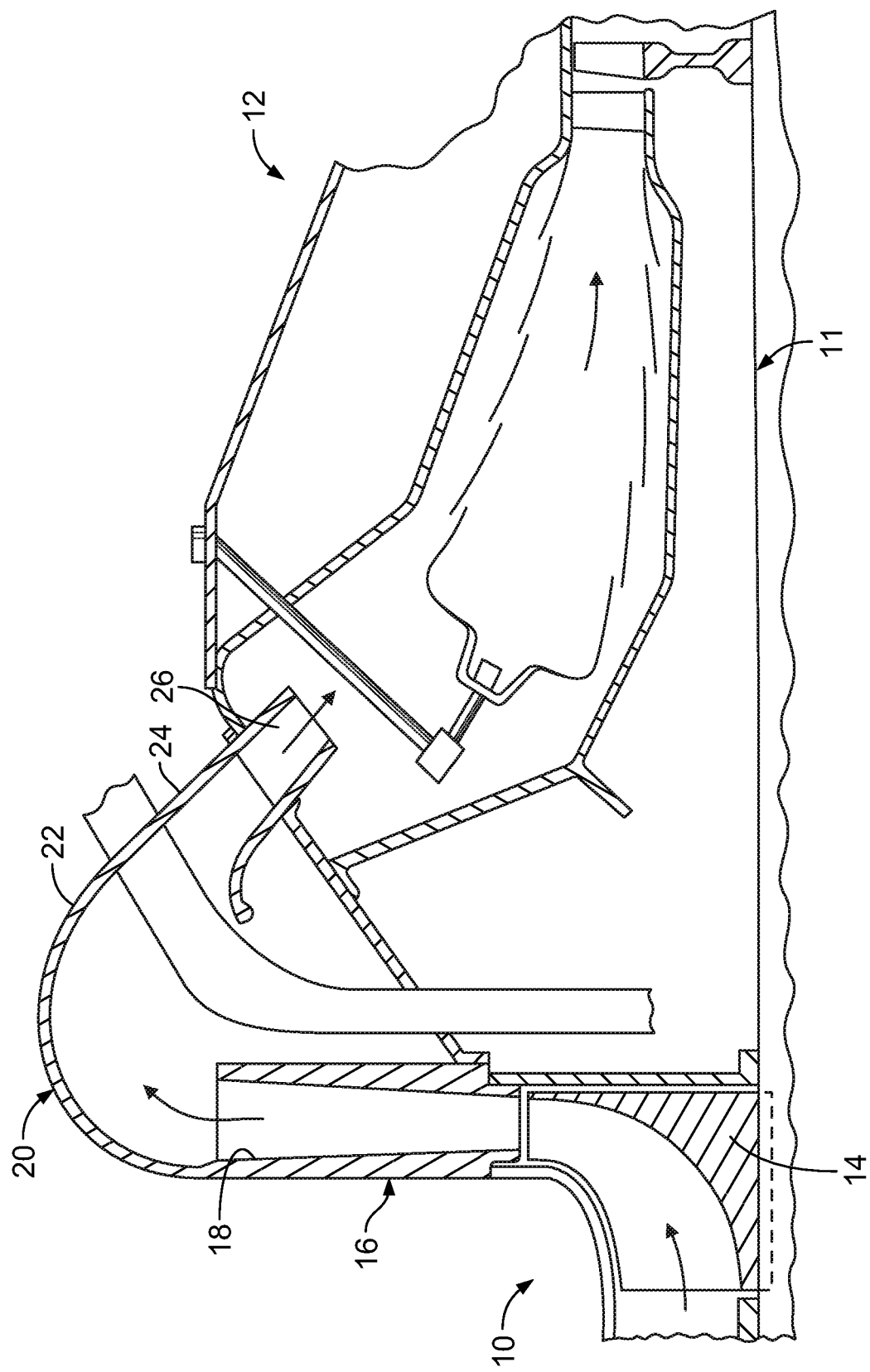
FIG. 1 is a cross-sectional view of portions of a centrifugal compressor and annular-shaped combustor of a gas turbine engine according to one example.

Reference will now be made in detail to present embodiments of the inventive subject matter, one or more examples of which are illustrated in the accompanying drawings. The detailed description uses numerical and letter designations to refer to features in the drawings. Like or similar designations in the drawings and description have been used to refer to like or similar parts of the inventive subject matter. As used herein, the terms "first," "second," and "third" may be used interchangeably to distinguish one component from another and are not intended to signify location or importance of the individual components.

FIG. 1 is a cross-sectional view of portions of a centrifugal compressor 10 and annular-shaped combustor 12 of a gas turbine engine according to one example. A centerline 11 of the engine is shown in FIG. 1. The compressor 10 includes a rotating impeller 14 that increases the kinetic energy of gas flowing through the compressor. A stationary annular-shaped diffuser 16 circumscribes the impeller 14 and decreases the velocity of fluid flow leaving the impeller 14 to increase the static pressure of the gas. Diffusers 16 are typically composed of either vanes or pipes that define a plurality of circumferentially-spaced passages 18.

Both vane and pipe-type diffusers can include a transition region 20 downstream of diffuser passages 18 to match the flow path of the diffuser flow path to the combustor 12. The transition region 20 includes an annular manifold 22 that receives the radially-outward air flow from the diffuser 16. The manifold 22 terminates with a generally conical section 24 in which several deswirler vanes 26 are positioned immediately upstream of the entrance to the combustor 12.

In contrast, one or more embodiments of the inventive subject matter described herein provide for a rotating detonation engine that does not include or rely on such diffusors or deswirling vanes. The inventive subject matter described herein provides fuel and air injection handling systems and methods for a combustor of a rotating detonation engine. The systems and methods obviate the need for a diffusor and deswirler vanes as the swirling motion of gas (e.g., air) from the last stage of compressor blades is preserved and radially directed outward into an annular combustion chamber of the rotating detonation engine. This inventive subject matter can reduce the size of the combustor by eliminating the upstream deswirler vanes and the diffusor. As the swirl movement of the gas entering the combustor is preserved, this may help increase the flow turning angle (or increase the swirl component at the exit of the combustor).

Figure 2:
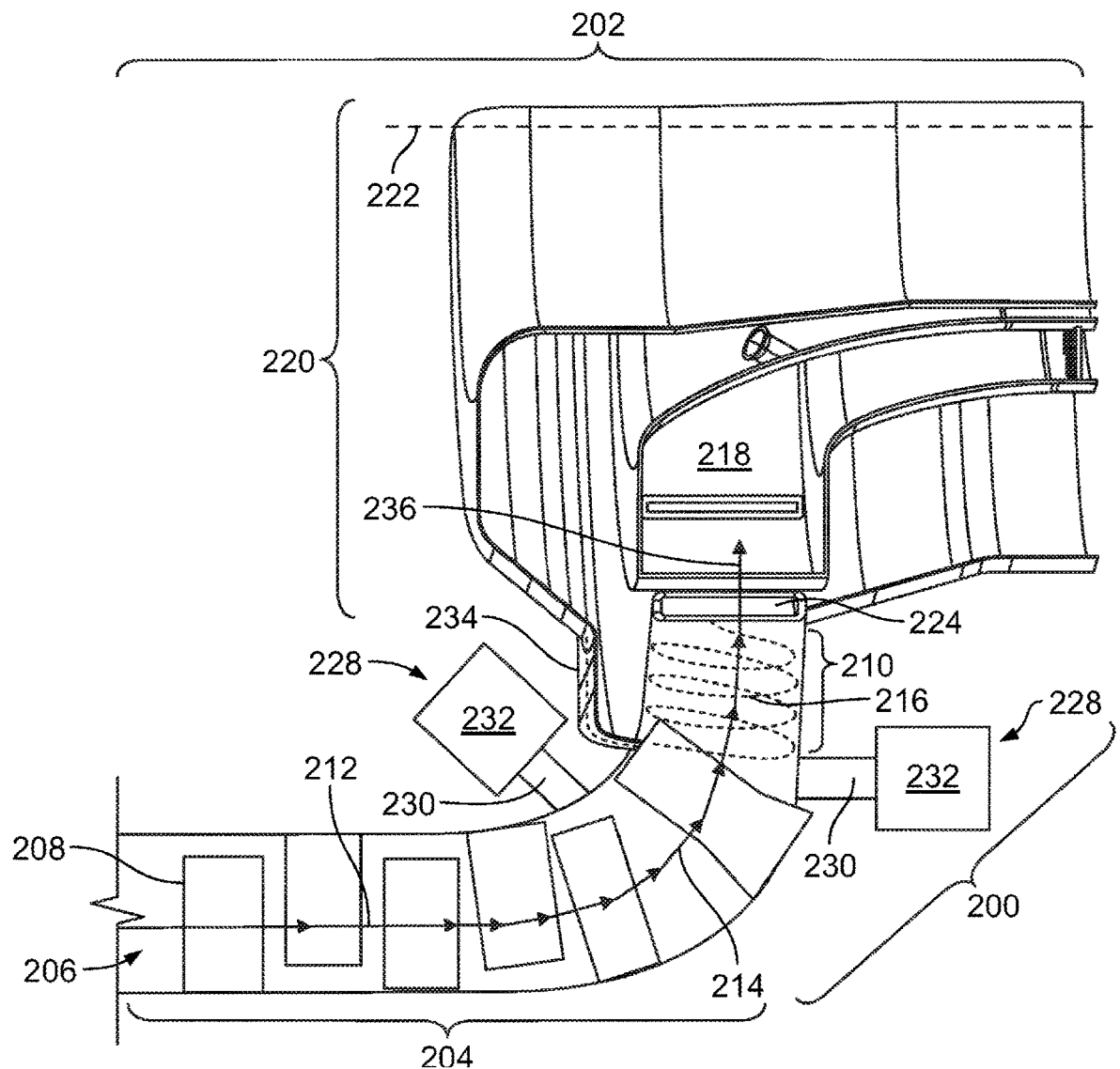
FIG. 2 schematically illustrates a cross-sectional view of a lower half of a fuel and air injection handling system for a rotating detonation engine.

FIG. 2 schematically illustrates a cross-sectional view of a lower half of a fuel and air injection handling system 200 for a rotating detonation engine 202 (only showing the aft end of the compressor and the combustor; not shown are the compressor, the turbine, the controls, the inlets and the exhaust systems). The components of FIG. 2 are not drawn to scale. The system 200 includes a compressor 204 that compresses gas (e.g., air) received via a compressor inlet 206. The compressor 204 includes multiple rotating blades 208 that compress the input gas. The rotating blades 208 rotate about or around a rotation axis 222 to compress the gas. This rotation of the blades 208 can induce or otherwise create a swirling motion 216 (either coming out of the page or going into the page) of the gas as the gas moves along a flow direction 214. This swirling motion 216 can include movement of the gas that is closer to a spiral movement than a linear movement about the engine axis 222. This swirling motion 216 of the gas can continue through an outlet 210 of the compressor 204.

Only the lower half of the combustor 220 is shown in FIG. 2. The lower half of the combustor 220 may appear similar or identical to the upper half shown in FIG. 3. The swirling gas that is output from the compressor 204 is directed into a detonation cavity 218 of the annular combustor 220 of the rotating detonation engine 202. The annular combustor 220 extends along and encircles an annular axis 222. The combustor 220 includes one or more cavity inlets 224 that provide access into the interior cavity 218 of the combustor 220. The cavity inlets 224 are shown as slots that are elongated in directions that are parallel to the annular axis 222. Optionally, the inlets 224 can have a different shape and/or be oriented in another direction.

The inlets 224 are oriented to at least partially preserve the swirling motion 216 of the compressed gas that is output from the compressor 204. For example, the direction that is normal to the opening defined by the inlet 224 shown in FIG. 2 may be oriented as a tangential line to the inner surface of the cavity 218. This can permit the incoming compressed gas to continue swirling within the annular cavity 218 and around the annular axis 222.

The combustor 220 combusts the compressed gas from the compressor 204 in detonations that rotate within the detonation cavity 218 around the annular axis 222 of the combustor 220. For example, the detonations can rotate in a swirl or circle around the annular axis 222, with the swirl or circle extending into and out of the plane of FIG. 2. As shown in FIG. 2, the combustor 220 is fluidly and directly coupled with the compressor outlet 210 (e.g., without any diffusor conduit and without any deswirler vane between the outlet 210 and the inlet(s) 224). The diffusor and deswirler vanes are not present because the diffusor and/or deswirler vanes could reduce the swirling motion 216 of the gas exiting the compressor 204. The swirling motion 216 can assist with causing the detonations within the cavity 218 of the combustor 220 to rotate in the cavity 218 around the axis 222 as the detonations also move along the axis 222 in the cavity 218. Additionally, directly coupling the compressor 204 with the combustor 220 without any diffusor or deswirler between the compressor 204 and combustor 220 reduces the size and footprint of the engine 202.

The system 200 optionally can include one or more detuning cavities 228 that are fluidly coupled with the compressor 204. The detuning cavities 228 can be enclosed interior chambers 232 that have smaller inlets 230 into the cavities 228 than the cavities 228 themselves. The inlets 230 into the detuning cavities 228 can be fluidly coupled with the compressor 204 in locations that are upstream of the combustor 220 along the flow direction 214 of the gas. The detuning cavities 228 are positioned and fluidly coupled with the compressor 204 to dampen one or more frequencies of the compressed gas that is output from the compressor 204. The detuning cavities 228 absorb frequencies that are produced in the detonation process in the combustor 220 that propagate into the compressor 204. The upstream propagating pressure excursions in the compressor 204 could otherwise stall the compression process.

One or more fuel injectors 234 optionally can be fluidly coupled with the compressor 204 and the combustor 220. The fuel injectors 234 can inject fuel into locations that are close to the inlets 224 of the combustion cavity 218 of the combustor 220. For example, the fuel injectors 234 can be fluidly coupled with the compressor 204 and the combustor 220 at or within the outlet 210 of the compressor 204. The fuel injectors 234 can inject fuel into the flow of the gas output by the compressor 204 to assist with combusting the gas in the combustor 220 as the rotating detonations.

In the illustrated embodiment, the swirling gas that is output by the compressor 204 is directed into the combustor cavity 218 in a radially inward direction 236. The gas is directed into the inlets 224 such that the gas moves toward the annular axis 222 as the gas first enters the combustor cavity 218. For example, the inlets 224 are positioned outside of the annular axis 222.

Figure 3:
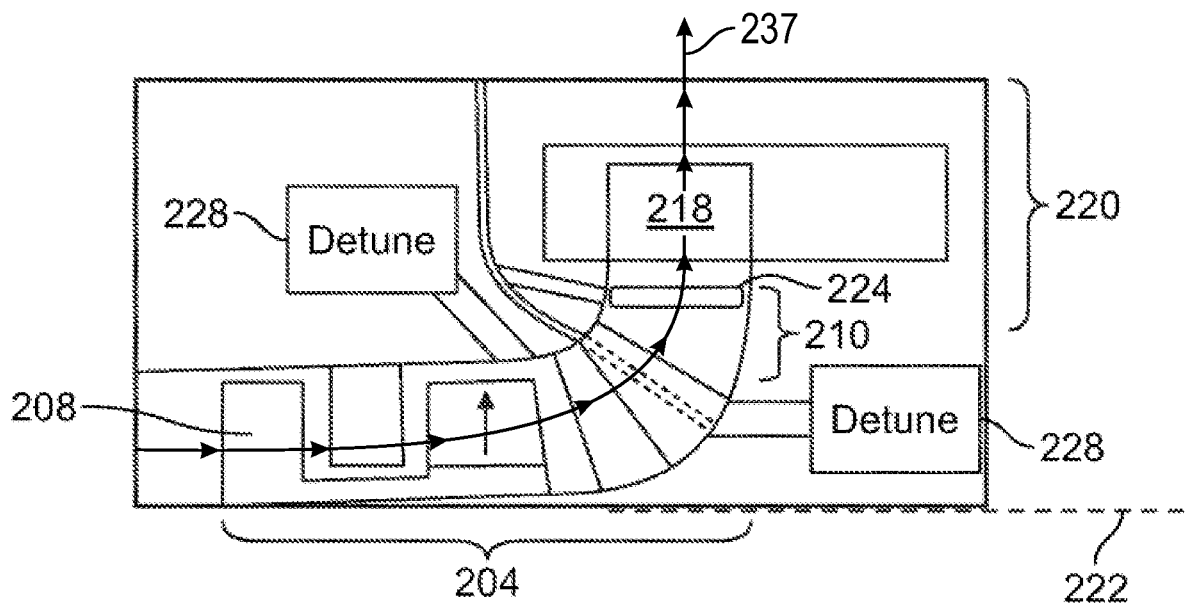
FIG. 3 schematically illustrates a cross-sectional view of an upper half of another embodiment of a fuel and air injection handling system for the rotating detonation engine shown in FIG. 2.

Conversely, the swirling gas that is output by the compressor 204 can be directed into the combustor cavity 218 in a radially outward direction 237, as shown in FIG. 3. FIG. 3 schematically illustrates a cross-sectional view of an upper half of another embodiment of a fuel and air injection handling system 300 for the rotating detonation engine 202. The system 300 includes many of the same components as the system 200 shown in FIG. 2. One difference between the systems 200, 300 is that the compressor 204 couples with the inlet 224 into the combustor 220 in a location that is between the combustor 220 and the annular axis 222. For example, while the compressor 204 coupled with the combustor 220 in a location that is outside of the combustor 220 in the system 200 shown in FIG. 2 (such that the inlet 224 into the combustor 220 is between the annular axis 222 and the outlet 210 of the compressor 204), the system 300 includes the compressor 204 coupled with the combustor 220 in the system 300 shown in FIG. 3 such that the outlet 210 of the compressor 204 is between the inlet 224 of the combustor 220 and the annular axis 222).

This location of the compressor 204 and combustor 220 in the system 300 causes the gas exiting the compressor 204 to enter the cavity 218 of the combustor 220 in a direction that is radially outward from the annular axis 222. For example, the gas is directed into the inlets 224 such that the gas moves away from the annular axis 222 as the gas first enters the combustor cavity 218.

Figure 4:
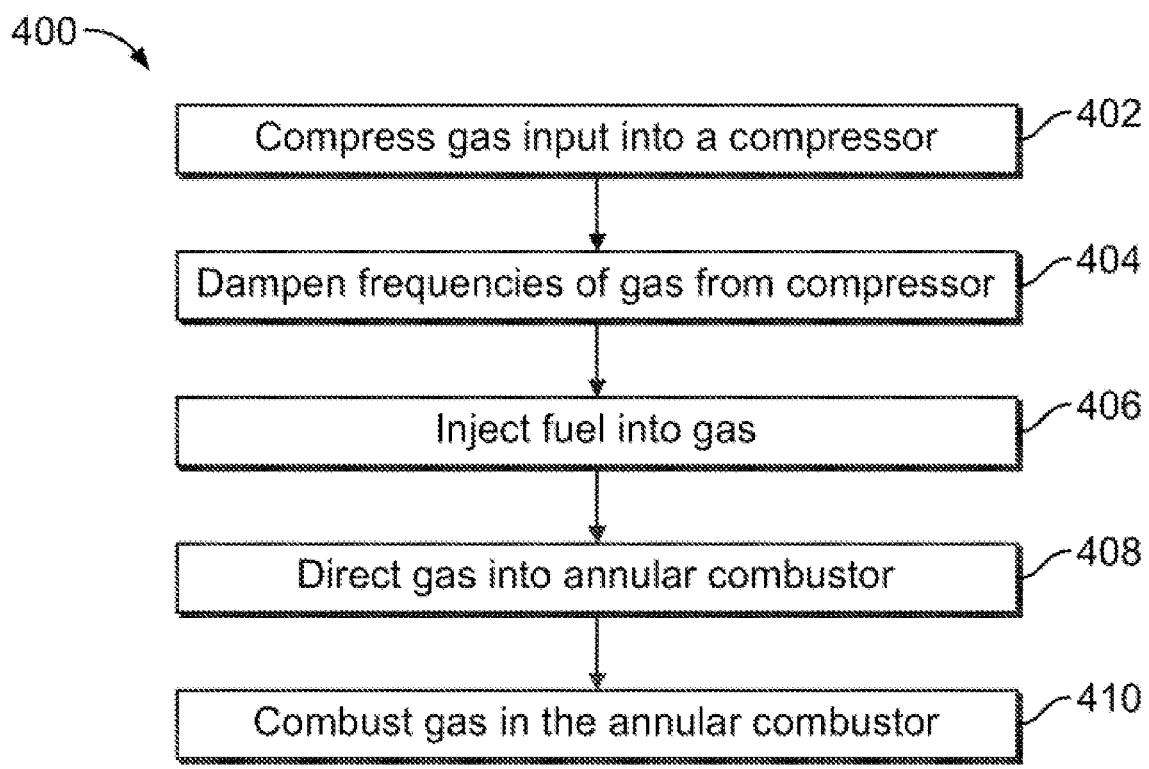
FIG. 4 illustrates a flowchart of one embodiment of a method for handling fuel and air injection for a rotating detonation engine.

FIG. 4 illustrates a flowchart of one embodiment of a method 400 for handling fuel and air injection for a rotating detonation engine. The method 400 can represent operations of the handling systems 200, 300 shown and described herein. At 402, gas is compressed in a compressor. The gas can be air that is directed into the compressor. Rotating blades in different stages of the compressor can compress the gas to increase the energy of the gas. The compressed gas may have swirling movement or motion due to the rotating motion of the compressor blades. This swirling motion of the gas can continue after the gas exits the compressor.

At 404, one or more frequencies of the compressed gas from the compressor are dampened. As described above, one or more dampening cavities can receive portions of the compressed gas that oscillate at frequencies that could disrupt or destroy the swirling motion of the gas. Because the swirling motion of the gas can assist in rotating detonations within the combustor, the frequencies of gas oscillations that disrupt this swirling motion can be absorbed or dampened to minimize or reduce the disruptions.

At 406, fuel is injected into the compressed gas. One or more fuel injectors can inject liquid fuel into the compressed, swirling gas prior to entry of the gas into the combustor. In one embodiment, the fuel can be injected into the gas within the compressor outlet and prior to the gas entering the combustor.

At 408, the gas is directed into the annular cavity of the combustor. In one embodiment, the gas is directed into the cavity through a tangential slot that directs the gas around the annular axis of the combustor inside the cavity. The compressor and slot can be positioned such that the gas enters the combustor cavity in a radially inward direction (e.g., toward the annular axis). Alternatively, the compressor and slot can be positioned such that the gas enters the combustor cavity in a radially outward direction (e.g., away from the annular axis).

At 410, the gas and fuel are combusted within the cavity of the combustor. The detonation of the gas and fuel can rotate around the annular axis within the combustor. The detonation can rotate around the annular axis due to the swirling motion of the gas as the gas enters the combustor cavity. This swirling motion can cause the detonation to rotate around the annular axis and move along the annular axis, such as by moving in a spiral or corkscrew path in the combustor cavity around the annular axis.

The energy generated in the combustor can generate propulsive energy that exits the opposite side of the combustor. This energy can be used to propel a vehicle that includes the rotating detonation engine.

In one embodiment, a fuel and air injection handling system for a rotating detonation engine is provided. The system includes a compressor configured to compress air received via a compressor inlet and configured to output the air that is compressed as swirling, compressed air through a compressor outlet. The system also includes an annular rotating detonation combustor fluidly coupled with the compressor outlet. The annular rotating detonation combustor has a detonation cavity that extends around an annular axis, the annular rotating detonation combustor configured to combust the compressed air from the compressor in detonations that rotate within the detonation cavity around the annular axis of the annular rotating detonation combustor. The annular rotating detonation combustor is fluidly and directly coupled with the compressor outlet (e.g., without a diffusor conduit and without a deswirler vane between the compressor outlet and the rotating detonation combustor).

Optionally, the annular rotating detonation combustor is directly coupled with the compressor outlet (e.g., without the diffusor conduit and without the deswirler vane) such that swirling movement of the compressed air from the compressor is maintained as the compressed air enters the detonation cavity of the annular rotating detonation combustor.

Optionally, the annular rotating detonation combustor is directly coupled with the compressor outlet such that the swirling movement of the compressed air from the compressor rotates the detonations in the detonation cavity around the annular axis.

Optionally, the system also includes one or more detuning cavities fluidly coupled with the compressor upstream of the detonation cavity of the annular rotating detonation combustor.

Optionally, the one or more detuning cavities are positioned and fluidly coupled with the compressor to dampen one or more frequencies of the compressed air that is output from the compressor prior to the compressed air being introduced into the detonation cavity of the annular rotating detonation combustor.

Optionally, the system also includes one or more fuel injectors fluidly coupled with the compressor and the detonation cavity of the annular rotating detonation combustor. The one or more fuel injectors can be fluidly coupled with the compressor and the detonation cavity upstream of an inlet of the detonation cavity.

Optionally, the annular rotating detonation combustor includes one or more cavity inlets that are fluidly coupled with the compressor outlet, the one or more cavity inlets tangentially positioned relative to the annular axis of the annular rotating detonation combustor such that the compressed air from the compressor is rotated in the detonation cavity around the annular axis.

Optionally, the compressor outlet is fluidly coupled with the detonation cavity of the annular rotating detonation combustor at one or more locations between the annular axis of the annular rotating detonation combustor and the detonation cavity of the annular rotating detonation combustor such that the compressed air from the compressor is introduced into the detonation cavity in one or more directions oriented radially outward from the annular axis.

Optionally, the compressor outlet is fluidly coupled with the detonation cavity of the annular rotating detonation combustor at one or more locations outside of the annular axis of the annular rotating detonation combustor and outside of the detonation cavity of the annular rotating detonation combustor such that the compressed air from the compressor is introduced into the detonation cavity in one or more directions oriented radially inward toward the annular axis.

Optionally, the detonation cavity of the annular rotating detonation combustor extends around and encircles, but does not encompass, the annular axis.

In one embodiment, a fuel and air injection handling system for a rotating detonation engine is provided. The system includes a compressor configured to compress input air and to output the input air that is compressed as compressed air through a compressor outlet, and a combustor fluidly coupled with the compressor outlet. The combustor has an annular detonation cavity that extends around an annular axis. The combustor is configured to combust the compressed air from the compressor in detonations that rotate around the annular axis within the annular detonation cavity. The combustor is fluidly and directly coupled with the compressor outlet (e.g., without one or more of a diffusor conduit or a deswirler vane between the compressor outlet and the annular detonation cavity).

Optionally, the combustor is fluidly and directly coupled with the compressor outlet (e.g., without either of the diffusor conduit or the deswirler vane between the compressor outlet and the annular detonation cavity).

Optionally, the combustor is directly coupled with the compressor outlet such that swirling movement of the compressed air from the compressor continues as the compressed air enters the annular detonation cavity of the combustor.

Optionally, the system also includes one or more detuning cavities fluidly coupled with the compressor upstream of the annular detonation cavity of the combustor.

Optionally, the one or more detuning cavities are positioned and fluidly coupled with the compressor to dampen one or more frequencies of the compressed air that is output from the compressor prior to the compressed air being introduced into the annular detonation cavity of the combustor.

Optionally, the system also includes one or more fuel injectors fluidly coupled with the compressor and the annular detonation cavity of the combustor at an inlet of the combustor.

Optionally, the combustor includes one or more cavity inlets that are fluidly coupled with the compressor outlet. The one or more cavity inlets can be tangentially positioned relative to the annular axis of the annular detonation cavity such that the compressed air from the compressor is rotated in the annular detonation cavity around the annular axis.

Optionally, the one or more cavity inlets are positioned radially inside of the combustor relative to the annular axis such that the compressed air from the compressor is introduced into the annular detonation cavity in one or more directions oriented radially outward from the annular axis.

Optionally, the one or more cavity inlets are positioned radially outside of the combustor relative to the annular axis such that the compressed air from the compressor is introduced into the annular detonation cavity in one or more directions oriented radially inward toward the annular axis.

In one embodiment, a method for handling fuel and air injection for a rotating detonation engine is provided. The method includes compressing inlet air that is input into a compressor to swirling, compressed air, and directing the swirling, compressed air into an annular rotating detonation combustor. The swirling, compressed air does not pass through a diffusor conduit or a deswirler vane between the compressor and the combustor, and combusting the swirling, compressed air into one or more rotating detonations that rotate around an annular axis of the combustor in a detonation cavity of the combustor.

Optionally, the swirling, compressed air is directed into the combustor and does not pass through the diffusor conduit or the deswirler vane such that swirling movement of the compressed air from the compressor is maintained as the compressed air enters the detonation cavity of the combustor.

Optionally, the method also includes dampening one or more frequencies of the compressed air that is output from the compressor prior to the compressed air being introduced into the detonation cavity of the combustor.

Optionally, the method also includes injecting fuel in one or more locations that are upstream of an inlet of the detonation cavity of the combustor.

Optionally, the swirling, compressed air is directed into the detonation cavity of the combustor along one or more tangential directions relative to the annular axis of the combustor such that the compressed air from the compressor is rotated in the detonation cavity around the annular axis.

Optionally, the swirling, compressed air is directed into the detonation cavity of the combustor along one or more directions oriented radially outward from the annular axis.

Optionally, the swirling, compressed air is directed into the detonation cavity of the combustor along one or more directions oriented radially inward toward the annular axis.

This written description uses examples to disclose the inventive subject matter, including the best mode, and to enable a person of ordinary skill in the art to practice the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel and air injection handling system for a rotating detonation engine, the fuel and air injection handling system comprising:
   a compressor configured to compress air received via a compressor inlet and configured to output the air that is compressed as a compressed air through a compressor outlet, the compressor comprising a plurality of rotating blades rotating about an annular axis and configured to induce a swirling motion to the compressed air;
   an annular rotating detonation combustor fluidly coupled and directly coupled with the compressor outlet, the annular rotating detonation combustor having a detonation cavity that extends around the annular axis, the annular rotating detonation combustor configured to combust the compressed air from the compressor in detonations that rotate within the detonation cavity around the annular axis of the annular rotating detonation combustor;
   a plurality of cavity inlets configured to provide access to the detonation cavity, wherein each of the plurality of cavity inlets is an opening elongated in a direction parallel to the annular axis and is tangentially positioned relative to the annular axis of the detonation cavity, such that the plurality of cavity inlets are oriented to preserve the swirling motion to the compressed air such that the swirling motion of the compressed air from the compressor rotates the detonations in the detonation cavity in a swirl or circle around the annular axis;

one or more detuning cavities, each of the one or more detuning cavities having an inlet entrance fluidly coupled with the compressor upstream of the annular rotating detonation combustor along a flow direction of the compressed air, the entrance being smaller than the respective one or more detuning cavities; and one or more fuel injectors fluidly coupled with the compressor and the annular rotating detonation combustor within the compressor outlet, wherein the compressed air is directed into the detonation cavity in a radial direction with respect to the annular axis.

2. The fuel and air injection handling system of claim 1, wherein the one or more detuning cavities are configured to absorb a plurality of frequencies produced in the annular rotating detonation combustor that propagates upstream into the compressor and disrupts the swirling motion.

3. The fuel and air injection handling system of claim 1, wherein the one or more detuning cavities are positioned and fluidly coupled with the compressor to dampen one or more frequencies of the compressed air that is output from the compressor prior to the compressed air being introduced into the detonation cavity of the annular rotating detonation combustor.

4. The fuel and air injection handling system of claim 1, wherein the compressor outlet is fluidly coupled with the detonation cavity of the annular rotating detonation combustor at one or more locations between the annular axis of the annular rotating detonation combustor and the detonation cavity of the annular rotating detonation combustor such that the compressed air from the compressor is introduced into the detonation cavity in one or more directions oriented radially outward from the annular axis.

5. The fuel and air injection handling system of claim 1, wherein the compressor outlet is fluidly coupled with the detonation cavity of the annular rotating detonation combustor at one or more locations outside of the annular axis of the annular rotating detonation combustor and outside of the detonation cavity of the annular rotating detonation combustor such that the compressed air from the compressor is introduced into the detonation cavity in one or more directions oriented radially inward toward the annular axis.

6. A fuel and air injection handling system for a rotating detonation engine, the fuel and air injection handling system comprising:
a compressor configured to compress input air and to output the input air that is compressed as a compressed air through a compressor outlet, the compressor comprising a plurality of rotating blades rotating about an annular axis and configured to induce a swirling motion to the compressed air; and
a combustor fluidly coupled and directly coupled with the compressor outlet, the combustor having an annular detonation cavity that extends around the annular axis, the combustor configured to combust the compressed air from the compressor in detonations that rotate around the annular axis within the annular detonation cavity;
a plurality of cavity inlets configured to provide access to the annular detonation cavity, wherein each of the plurality of cavity inlets is an opening elongated in a direction parallel to the annular axis and is tangentially positioned relative to the annular axis of the annular detonation cavity, such that the plurality of cavity inlets are oriented to preserve the swirling motion to the compressed air such that the swirling motion of the compressed air from the compressor rotates the detonations in the annular detonation cavity in a swirl or circle around the annular axis;
one or more detuning cavities, each of the one or more detuning cavities having an entrance fluidly coupled with the compressor upstream of the combustor along a flow direction of the compressed air, the entrance being smaller than the respective one or more detuning cavities; and
one or more fuel injectors fluidly coupled with the compressor and the combustor within the compressor outlet,
wherein the compressed air is directed into the annular detonation cavity in a radial direction with respect to the annular axis.

7. The fuel and air injection handling system of claim 6, wherein the one or more detuning cavities are configured to absorb a plurality of frequencies produced in the combustor that propagates upstream into the compressor and disrupts the swirling motion.

8. The fuel and air injection handling system of claim 6, wherein the one or more detuning cavities are positioned and fluidly coupled with the compressor to dampen one or more frequencies of the compressed air that is output from the compressor prior to the compressed air being introduced into the annular detonation cavity of the combustor.

9. The fuel and air injection handling system of claim 6, wherein the plurality of cavity inlets are positioned radially inside of the combustor relative to the annular axis such that the compressed air from the compressor is introduced into the annular detonation cavity in one or more directions oriented radially outward from the annular axis.

10. The fuel and air injection handling system of claim 6, wherein the plurality of cavity inlets are positioned radially outside of the combustor relative to the annular axis such that the compressed air from the compressor is introduced into the annular detonation cavity in one or more directions oriented radially inward toward the annular axis.

11. A method for handling fuel and air injection for a rotating detonation engine, the method comprising:
compressing inlet air that is received into a compressor via a compressor inlet into a compressed air;
rotating a plurality of blades and inducing a swirling motion to the compressed air that is output as a swirling compressed air, through a compressor outlet;
directing the swirling compressed air into an annular rotating detonation combustor in a radial direction with respect to an annular axis of the annular rotating detonation combustor, the annular rotating detonation combustor being fluidly and directly coupled with the compressor outlet;
providing a plurality of cavity inlets to provide an access to a detonation cavity of the annular rotating detonation combustor, wherein each of the plurality of cavity inlets is an opening elongated in a direction parallel to the annular axis of the annular rotating detonation combustor;
orienting the plurality of cavity inlets tangentially relative to the annular axis of the detonation cavity;
orienting the plurality of cavity inlets to preserve the swirling motion of the swirling compressed air;
combusting the swirling compressed air from the compressor in detonations that rotate around the annular axis of the annular rotating detonation combustor in the detonation cavity of the annular rotating detonation combustor, wherein the swirling motion of the compressed air from the compressor rotates the detonations in the detonation cavity in a swirl or circle around the annular axis;

absorbing a plurality of frequencies produced in the annular rotating detonation combustor that propagates upstream into the compressor and disrupts the swirling motion with one or more detuning cavities, each of the one or more detuning cavities having an entrance fluidly coupled with the compressor upstream of the annular rotating detonation combustor along a flow direction of the compressed air, the entrance being smaller than the respective one or more detuning cavities; and injecting a fuel into the compressor outlet with one or more fuel injectors fluidly coupled with the compressor and the annular rotating detonation combustor within the compressor outlet.

\* \* \* \* \*